May 10, 1955  G. R. O'NEIL  2,707,908
PLANTER DEPTH GAUGE
Filed Sept. 29, 1950  2 Sheets-Sheet 1
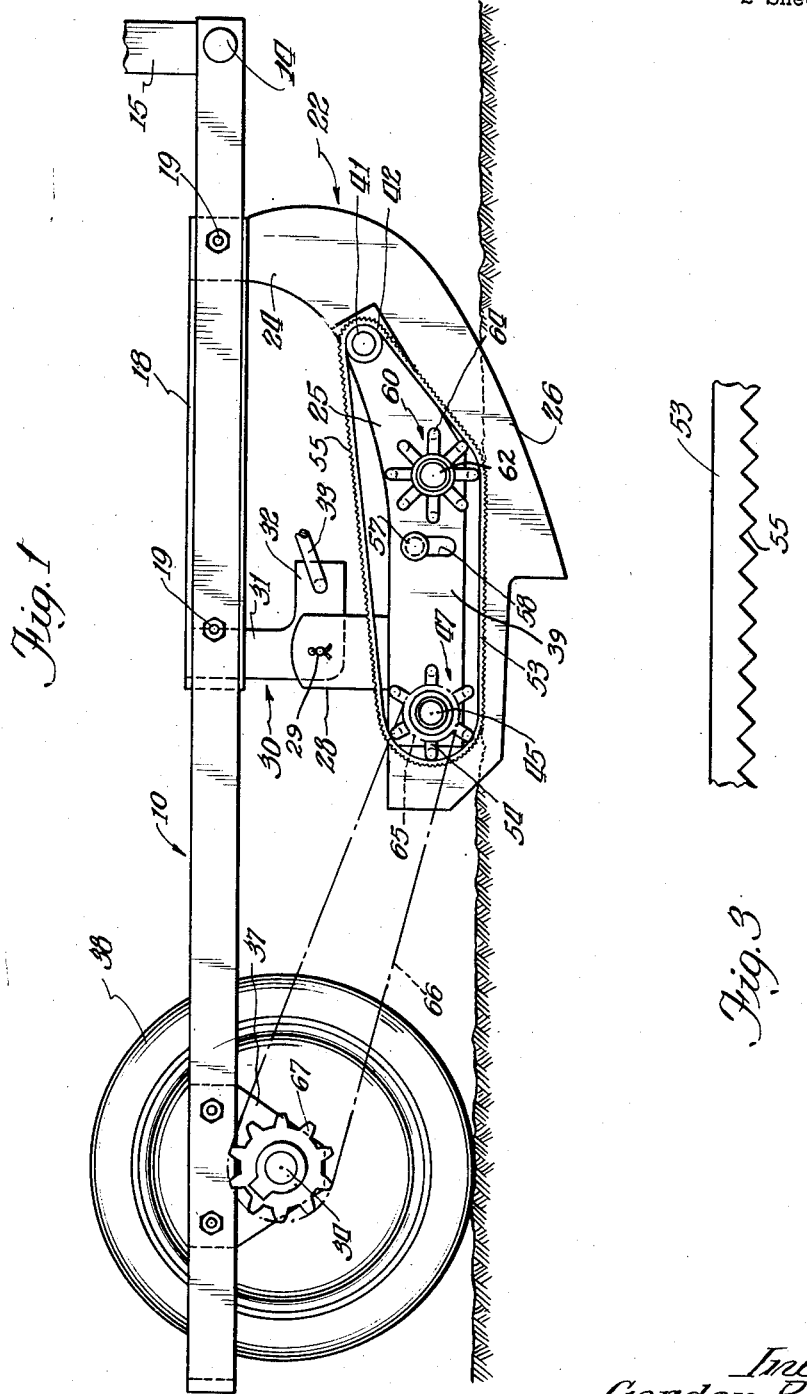
Inventor:
Gordon R. O'Neil
By: Paul O. Pippel
Atty.

May 10, 1955
G. R. O'NEIL
2,707,908
PLANTER DEPTH GAUGE
Filed Sept. 29, 1950
2 Sheets-Sheet 2
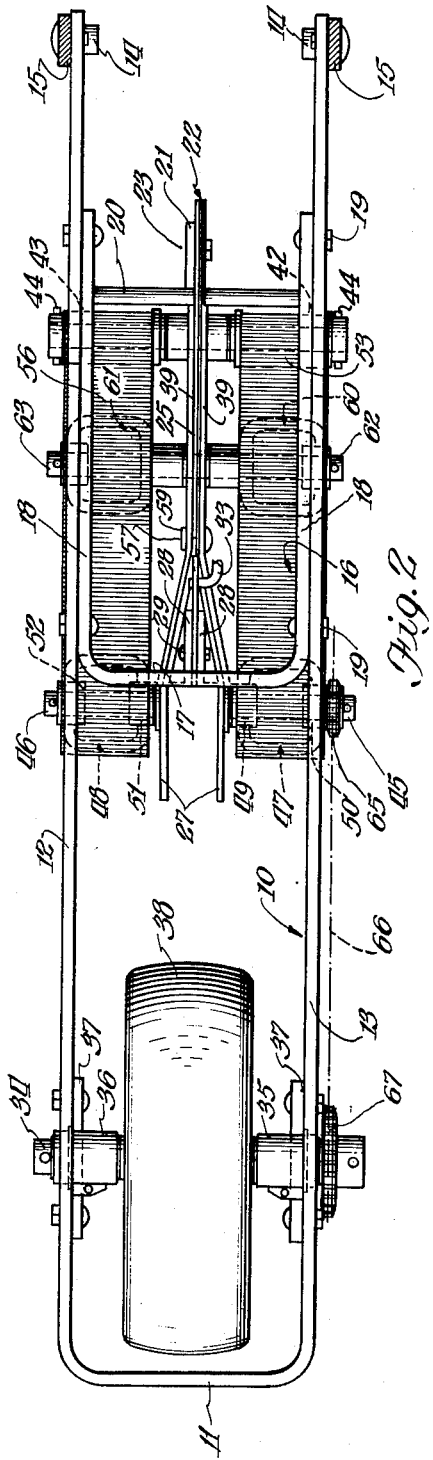
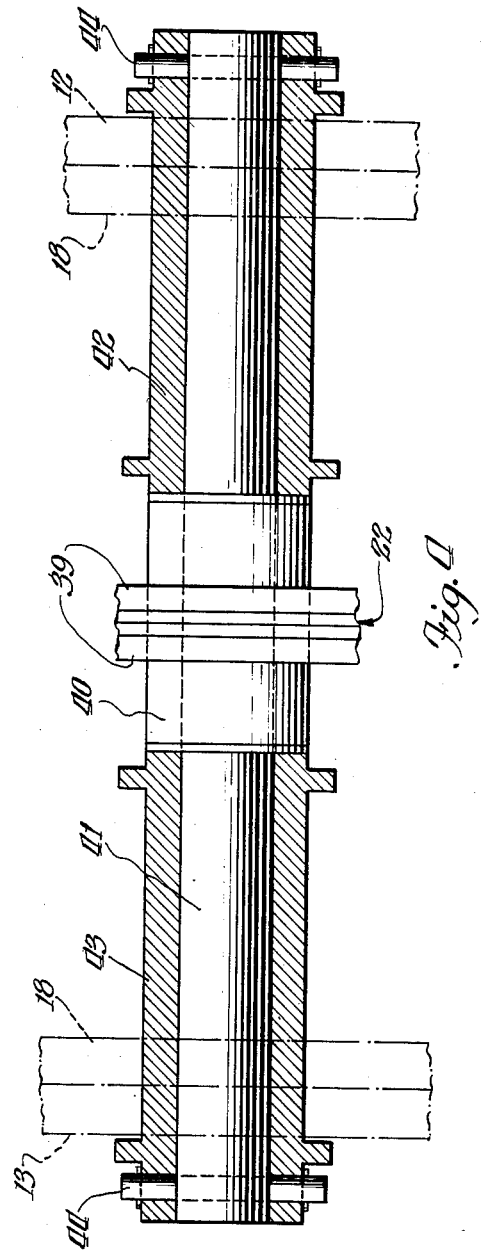
Inventor:
Gordon R. O'Neil
By: Paul O. Pippel
Atty.

United States Patent Office 2,707,908
Patented May 10, 1955

2,707,908

PLANTER DEPTH GAUGE

Gordon R. O'Neil, Canton, Ill., assignor to International Harvester Company, a corporation of New Jersey Application September 29, 1950, Serial No. 187,505

7 Claims. (Cl. 97—190)

This invention relates to agricultural implements and particularly to planters. More specifically, the invention concerns gauging mechanism for a planter furrow opener.

An object of the invention is to provide a self-cleaning gauge device for a planter furrow opener of the runner type.

Another object of the invention is to provide for a planter runner, gauge means mounted directly thereon and adjustable with respect to the runner.

Gauge shoes for planter runners are known. Such shoes are more or less rigid and made of sheet metal. They are used on runners adapted to open furrows in soil piled up into a bed by bedder disks which travel in front of the runner. Such a shoe slides over the ground in the manner of a sled and in damp soil mud builds up on the bottom of the shoe and affects the planting depth, requiring frequent scraping. The shoe also tends to push loose dirt and trash in front of it and to become clogged. This invention overcomes these disadvantages and has for another of its objects the provision of a driven belt mounted directly on the runner and having a flexible ground-engaging surface. Such a shoe rolls over the loose soil and trash and dislodges dirt that adheres thereto.

These and other objects of the invention will become clear from the following detailed description when read in conjunction with the accompanying drawings wherein:

Fig. 1 is a view in side elevation of a planting unit embodying the features of this invention.

Fig. 2 is a plan view of the structure shown in Fig. 1.

Fig. 3 is an enlarged detail of a portion of the endless belt in elevation showing the V-shaped grooves therein.

Fig. 4 is a detail showing the rollers in section.

The numeral 10 designates an elongated U-shaped supporting frame having a transverse portion 11 at the rear end thereof and horizontal longitudinally extending side arms 12 and 13. This frame is adapted for attachment to a vehicle such as a tractor and the forward ends of the arms 12 and 13 are connected by pivot bolts 14 with vertically extending straps 15 which may be affixed to the body of a tractor or other propelling vehicle.

Also affixed to the frame 10 between the arms 12 and 13 thereof is another U-shaped support or sub-frame 16 having a transverse bight portion 17 and arms 18 which are secured by bolts 19 to the main support 10. A transverse bracing bar 20 extends between the arms 18 of the sub-frame 16 and the ends of the bar are welded thereto. A lug 21 welded to the bar 20 and projecting forwardly therefrom provides a support for the front end of a runner type furrow opener 22 which is secured to the lug by a bolt 23.

Runner or furrow opener 22 comprises an upwardly curved neck portion 24 and a longitudinally extending body portion 25 provided with a lower earth-penetrating cutting edge 26. The rear portion of the runner is bifurcated as indicated in Fig. 2 to provide rearwardly diverging arms 27. These arms provide between them an opening through which may be passed a seed tube for depositing seed or the like in the furrow made by the runner 22. This seed depositing mechanism is not shown. The rear portion of the runner has secured thereto a pair of lugs 28 which project upwardly and between which is fulcrumed at 29 a bell crank 30 having an upwardly extending arm 31 secured as by welding to the transverse portion 17 of frame 16. Another arm 32 of the bell crank has pivoted thereto the lower end of a link 33 which extends upwardly to the tractor or other propelling vehicle for raising and lowering the planter.

Between the arms 12 and 13 and the rear end of the frame 10 there is also mounted a transversely extending shaft 34 which is rotatably carried in bearings 35 and 36 mounted in brackets 37 secured to and depending from the frame 10. A press wheel 38 is mounted upon the shaft 34 and serves to cover the seed deposited in the furrow made by the runner 22.

Mounted upon the opposite side faces of the runner 22 are a pair of longitudinally extending plates 39 which likewise diverge rearwardly to rest against the sides of the bifurcated portion of the runner. An opening is provided in the forward ends of the plates 39 and the runner to receive a transversely extending sleeve member 40 which is welded to the plates 39 but rotatable in the runner. Likewise rotatably received in this sleeve 40 is a shaft 41 having portions extending laterally from opposite sides of the runner and plate assembly. Rollers 42 and 43 are provided on the projecting ends of the shaft 41 at opposite sides of the runner. These rollers abut the sleeve 40 at their inner ends and at their outer ends are secured to the shaft 41 by pins 44. The shaft 41 is mounted at the beginning of the upwardly curving neck portion 24 of the runner.

As viewed particularly well in Fig. 2, to the rearwardly diverging ends of the plates 39 are affixed as by welding laterally extending stub shafts 45 and 46, and mounted upon each of these shafts for rotation are drums 47 and 48 respectively. These drums are carried on spaced hubs 49 and 50 for drum 47 and hubs 51 and 52 for drum 48. It will be observed in Figs. 1 and 2 that the shafts 45 and 46 are mounted on the plates 39 on a horizontal line which is spaced vertically below the axis of the roller shaft 41.

As viewed in Fig. 1, an endless flexible belt 53 of any suitable material but preferably of rubber is trained around the fingers 54 of the drum 47 and the roller 42 mounted on the shaft 41. The tread of this belt is preferably transversely grooved to form V-shaped notches 55 as indicated in the enlarged detail shown in Fig. 3.

At this point it should be clear that the plate 39 carrying the drum 47 is swingable in a vertical plane about the axis of the shaft 41 at the forward end of the runner. This is likewise true of the plate 39 on the opposite side of the runner upon which is mounted the drum 48 and the roller 43 about which is trained another endless belt 56. The plates 39 are secured to the sides of the runner and provision is made for vertical adjustment by a bolt 57 extending transversely through the plates 39 and the runner 22, the shank of the bolt being receivable in vertically extending slots 58 formed in the plates 39. A nut 59 on the threaded shank of the bolt 57 secures the plates 39 in a vertically adjusted position to the sides of the body 25 of the runner.

The lower flights of the belts 53 and 56 are adapted to engage the ground at a location vertically spaced above the cutting edge 26 of the runner to serve as a gauge means limiting the operating depth of the runner. However, since the plane through the axes of the shafts 45, 46 and 41 is inclined to the horizontal, additional drums 60 and 61 are provided and mounted for rotation upon stub shafts 62 and 63, respectively, affixed at one end to the plates 39 and extending laterally from opposite sides of the runner between the shafts 45, 46 and 41 but in horizontal alignment with the shafts 45, 46 carrying the drums 47, 48. The fingers 64 of the drums 60 and 61, as will be noted in Figs. 1 and 2, engage only the lower flight of the belts 53 and 56, providing between the drums a horizontal belt portion which is parallel to the ground line and forms the ground contacting surface.

When propelled over the ground the belts 53 and 56 may be driven by contact with the ground. However, the belts are preferably power driven, and for this purpose a sprocket wheel 65 is provided upon the hub 50 of the drum 47 and it is drivingly connected by a suitable endless chain 66 with a sprocket wheel 67 mounted upon the outer end of the shaft 34 carrying the press wheel 38. If desired, the sprocket wheel 65 may be driven from the power plant of the vehicle by which the planter is propelled. Drive from the sprocket wheel 67 is transmitted through sprocket 65 to drum 47 on the right-hand side of the runner as viewed in Fig. 2 and is further transmitted through the belt 53 to the rotatable shaft 41 and rollers 42 and 43 to also drive the belt 56 on the left-hand side of the runner.

It will be observed that movement of the bolts 57 in slots 58 in the plates 39 permits the vertical adjustment of these plates and the driven belts mounted thereon to vary the operating depth at which the runner penetrates. It should also be noted that, as pointed out before, dirt and trash cannot be pushed ahead by the belts 53 and 56 as it lays down the loose soil and trash and rolls over it; nor will the mud cling to the belts and interfere with the uniformity of planting depth because the belts are self-cleaning. The V-shaped grooves in the tread open up as the belt passes around the rollers and sloughs off mud and dirt which would otherwise cling thereto.

It is believed that the planter and depth gauge construction of this invention will be fully understood from the foregoing description. It may also be understood that the invention has been shown and described in its preferred embodiment only and that modifications may be made therein without departing from the spirit of the invention or the scope of the appended claims.

What is claimed is:

1. In a planter, a support, a furrow opener mounted on the support having an earth penetrating cutting edge, a pair of drums rotatably mounted on opposite sides of said furrow opener at one end thereof, a shaft rotatably mounted on the furrow opener at the other end thereof, rollers secured to said shaft at opposite sides of the furrow opener, an endless belt trained around one of said drums and the roller at one side of the furrow opener above the cutting edge, an endless belt trained around the other drum and the roller at the other side of the furrow opener, and means for driving one of the drums, whereby drive is transmitted through its associated belt and said roller to the other said belt.

2. In a planter, a support, a furrow opener mounted on the support having an earth penetrating cutting edge, supporting members adjustably attached to opposite sides of said furrow opener, a pair of drums rotatably mounted on said supports at opposite sides of said furrow opener at one end thereof, a shaft rotatably mounted on the furrow opener at the other end thereof, rollers secured to said shaft at opposite sides of the furrow opener, an endless belt trained around one of said drums and the roller at one side of the furrow opener above the cutting edge, an endless belt trained around the other drum and the roller at the other side of the furrow opener, and means for driving one of the drums, whereby drive is transmitted through its associated belt and said roller to the other said belt, and means for adjusting the vertical position of said supporting members with respect to the furrow opener to vary the operating depth thereof.

3. In a planter, a support, a longitudinally extending furrow opener mounted on the support having a lower earth penetrating cutting edge, a ground engaging wheel rotatably mounted on a transverse shaft on the support rearwardly of the furrow opener, a pair of longitudinally extending plates on opposite sides of the furrow opener, a transverse live shaft rotatably mounted in said plates and the furrow opener at the forward ends thereof and projecting laterally from opposite sides thereof, a roller secured to the shaft at each side of the furrow opener, a stub shaft secured at one end to each of said plates at the rear end of the furrow opener and projecting laterally therefrom parallel to said rollers, a drum rotatably mounted on each of said stub shafts, an endless belt at each side of the furrow opener trained around the respective rollers and drums to provide a ground engaging surface to limit the depth of penetration of the furrow opener, and a driving connection between said wheel and one of said drums, whereby drive is transmitted through one belt and said live shaft to drive the other belt.

4. In a planter, a support, a longitudinally extending furrow opener mounted on the support having a lower earth penetrating cutting edge, a pair of longitudinally extending plates on opposite sides of the furrow opener, a transverse live shaft rotatably mounted in said plates and the furrow opener at the forward ends thereof and projecting laterally from opposite sides thereof, a roller secured to the shaft at each side of the furrow opener, a stub shaft secured at one end to each of said plates at the rear end of the furrow opener and projecting laterally therefrom parallel to said rollers, a drum rotatably mounted on each said stub shaft, an endless belt at each side of the furrow opener trained around the respective rollers and drums to provide a ground engaging surface to limit the depth of penetration of the furrow opener, and means for driving one of said drums, whereby drive is transmitted through one belt and said live shaft to drive the other belt; a bolt and nut carried by the furrow opener rearwardly of said live shaft and vertical slots formed in said plates to slidably receive the bolt for vertically adjusting the belts relative to the furrow opener about the pivot axis of said live shaft.

5. In a planter, a support, a longitudinally extending furrow opener mounted on the support having a lower earth penetrating cutting edge, a pair of longitudinally extending plates on opposite sides of the furrow opener, a transverse live shaft rotatably mounted in said plates and the furrow opener at the forward ends thereof and projecting laterally from opposite sides thereof, a roller secured to the shaft at each side of the furrow opener, a stub shaft secured at one end to each of said plates at the rear end of the furrow opener and projecting laterally therefrom on a horizontal line rearwardly spaced from said rollers, a rotary drum rotatably mounted on each said stub shaft, an endless belt at each side of the furrow opener trained around the respective rollers and drums vertically spaced above the cutting edge of the furrow opener for gauging its depth of operation, and a second pair of drums rotatably mounted on a pair of stub shafts on and extending laterally from opposite sides of said plates between the live shaft and said first mentioned drums in horizontal alinement with the latter, said second pair of drums being engageable only with the lower flights of said belts to provide a horizontal ground engaging surface between the drums for gauging the depth of penetration of the furrow opener.

6. In a planter, a support, a longitudinally extending furrow opener mounted on the support having a lower earth penetrating cutting edge, a pair of longitudinally extending plates on opposite sides of the furrow opener, a transverse live shaft rotatably mounted in said plates and the furrow opener at the forward ends thereof and projecting laterally from opposite sides thereof, a roller secured to the shaft at each side of the furrow opener, a stub shaft secured at one end to each of said plates at the rear end of the furrow opener and projecting laterally therefrom on a horizontal line rearwardly spaced from said rollers, a rotary drum rotatably mounted on each of said stub shafts, an endless belt at each side of the furrow opener trained around the respective rollers and drums vertically spaced above the cutting edge of the furrow opener for gauging its depth of operation, and a second pair of drums rotatably mounted on a pair of stub shafts on and extending laterally from opposite sides of said plates between the live shaft and said first mentioned drums in horizontal alinement with the latter, said second pair of drums being engageable only with the lower flights of said belts to provide a horizontal ground engaging surface between the drums for gauging the depth of penetration of the furrow opener, and means for adjusting said plates vertically with respect to the furrow opener about the pivot of the plates on said live shaft to vary the operating depth of the furrow opener.

7. In a planter, a support, a longitudinally extending furrow opener mounted on the support having a lower earth penetrating cutting edge, a pair of longitudinally extending plates on opposite sides of the furrow opener, a transverse live shaft rotatably mounted in said plates and the furrow opener at the forward ends thereof and projecting laterally from opposite sides thereof, a roller secured to the shaft at each side of the furrow opener, a stub shaft secured at one end to each of said plates at the rear end of the furrow opener and projecting laterally therefrom on a horizontal line rearwardly spaced from said rollers, a rotary drum rotatably mounted on each of said stub shafts, an endless belt at each side of the furrow opener trained around the respective rollers and drums vertically spaced above the cutting edge of the furrow opener for gauging its depth of operation, and a second pair of drums rotatably mounted on a pair of stub shafts on and extending laterally from opposite sides of said plates between the live shaft and said first mentioned drums in horizontal alinement with the latter, said second pair of drums being engageable only with the lower flights of said belts to provide a horizontal ground engaging surface between the drums for gauging the depth of penetration of the furrow opener, and means for driving one of said first mentioned drums, whereby drive is transmitted through its associated belt and roller to the belt on the other side of the furrow opener.

References Cited in the file of this patent

UNITED STATES PATENTS

| 941,421 | Kilby et al. | Nov. 30, 1909 |
| 1,067,765 | Sherwood | July 15, 1913 |
| 1,161,298 | Felsman | Nov. 23, 1915 |